Oct. 1, 1963 H. C. GIESLER 3,105,256
DEVICES FOR REMOVING FOREIGN PARTICLES SIMULTANEOUSLY
FROM TWO CLOSELY ADJACENT PLANE SURFACES
Filed June 28, 1961 2 Sheets-Sheet 1

INVENTOR.
HAROLD C. GIESLER
BY Thomas J. Morgan
ATTORNEY

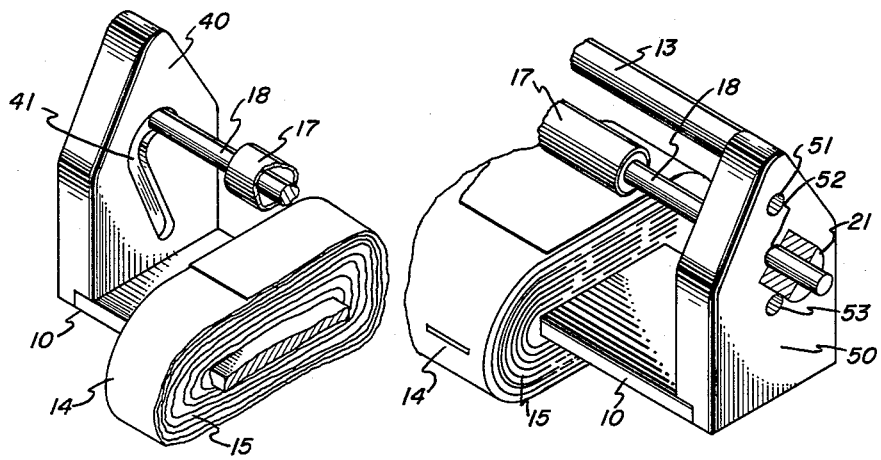

United States Patent Office 3,105,256
Patented Oct. 1, 1963

3,105,256
DEVICES FOR REMOVING FOREIGN PARTICLES SIMULTANEOUSLY FROM TWO CLOSELY ADJACENT PLANE SURFACES
Harold C. Giesler, Cincinnati, Ohio, assignor to Formica Corporation, Cincinnati, Ohio, a corporation of Delaware
Filed June 28, 1961, Ser. No. 120,292
5 Claims. (Cl. 15—104)

This invention relates to novel devices for removing foreign particles simultaneously from two closely adjacent plane surfaces, such as adjacent metal surfaces, as well as to the method of using said devices to accomplish this purpose. More particularly, this invention relates to novel devices, and to the method of using said devices, which have been found to be particularly effective in removing pit- and dent-producing foreign particles from pairs of closely adjacent plane surfaces in metal-clad laminating assemblies, wherein one of each pair of said surfaces is that of a thin sheet or foil of a relatively soft metal.

Metal-clad laminates of the type wherein a thin metal sheet or foil, e.g., a copper, silver or gold-plated silver foil, is bonded, by means of heat and pressure, to a thermosetting resin-impregnated base member, have become important articles of commerce in recent years. For example, they have found particularly widespread use in electrical applications, such as in the manufacture of printed circuits and the like.

In preparing laminates of the type in question, a thin metal sheet or foil, which has been treated to remove dirt, oils, lubricants, oxides and the like, thus providing a relatively clean metal surface, is first placed on top of a suitable base member. This base member, which has as its principal characteristic the property of insulating conductors of electricity mounted thereon from each other, ordinarily comprises one or more thermosetting resin-impregnated sheets or layers of fibrous material in matted or woven form. Fibrous sheets or layers conventionally employed in laminates of this type include those obtained from cellulosic fibers or papers, such as Kraft paper, or from glass or asbestos fibers, said sheets or layers being impregnated with a solution of a thermosetting resinous condensate, such as a phenol-formaldehyde, melamine-formaldehyde, benzoguanamine-formaldehyde, urea-formaldehyde, epoxy or polyester resinous condensate. A protective backing sheet, preferably one which comprises a material which may, if desired, be stripped from the finished laminate, is then placed on the other side of the base member. The assembly is then ready for lamination.

Laminating assemblies of this type may be individually laminated by application of heat and pressure thereto. However, for obvious economic reasons, it is common practice to consolidate a plurality of these individual laminating assemblies into one large assembly, or pack, preferably with pairs of individual assemblies being placed back-to-back, and then to laminate this pack in one operation.

In building such a pack, an individual laminating assembly is placed with its metal surface adjacent to a highly polished press platen of equal or slightly greater surface area. The function of the press platen is twofold. It chiefly serves to present a hard, smooth, defect-free surface to the metal surface of the laminating assembly, thus aiding in maintaining said metal surface free from defects. It also serves to separate the individual pairs of back-to-back laminating assemblies, thus permitting a plurality of these assemblies to be transformed into individual laminates in one operation. Metal press platens, and particularly those fabricated from highly polished stainless steel, are preferred, but platens fabricated from other metals, such as aluminum, as well as from other materials having the desired characteristics, such as glass, also may be employed.

Next, another individual laminating assembly is positioned back-to-back with the first assembly, with a protective backing sheet being placed between the base members of the individual assemblies. Then, another highly polished press platen is placed on the second assembly, adjacent to its metal surface. This entire procedure is repeated until a pack having the desired height has been built.

As previously indicated, this multiple laminating method affords definite economic advantages. However, it also presents one serious difficulty, due at least in part to the nature of the materials used in preparing the individual laminating assemblies.

Numerous tiny particles generally carrying a static charge, such as bits of resin, glass, dirt, lint and the like, which may be collectively described as air-born dust, are invariably present in the assembly area, and are strongly attracted to the statically charged surfaces of the highly polished press platens. The fibrous materials and impregnating resins used in preparing the base members constitute perhaps the greatest single source of these unwanted foreign particles, and this is particularly the case when the fibrous material employed comprises glass fibers.

The presence of any foreign particles between the highly polished press platens and the metal surfaces of the individual laminating assemblies produces very noticeable pits or dents in said metal surfaces, regardless of the size, texture or density of the foreign particles involved. In fact, severe pitting may occur even if the foreign particles responsible are not discernable to the naked eye. This is easily understandable, since the combined weight of laminating assemblies and platens in the pack or, oftentimes, the weight of a single platen, is sufficient to force foreign particles into the relatively soft metal surfaces in question. Even where this is not the case, the pressure applied to the pack in the lamination step will invariably be sufficient to force foreign particles into said metal surfaces, thereby causing pitting or denting.

Inasmuch as metal-clad laminates of the type in question must be free from defects of this kind in order to be acceptable for many of their most important uses, it is obvious that operating in the conventional manner, as outlined above, can only lead to a large percentage of rejects and, therefore, to a considerable economic disadvantage. It follows from this that a suitable means of overcoming this difficulty which would not itself add a significant measure of cost to the laminating procedure would be extremely valuable to the art.

Various attempts have been made by those skilled in the art to find such a means, but none of them have met with unqualified success. For example, it has been proposed that the laminating assemblies be individually hand-cleaned and then taped to similarly cleaned platens. This was found to be a tedious, time-consuming and, therefore, expensive procedure. Other measures tried included pressurizing the working area, vacuum cleaning the floor, walls, ceiling and fixtures in the working area, and even vacuum cleaning the worker's clothing. However, even such extreme measures as these did not produce results commensurate with the effort expended, since repeated handling of the individual laminating assemblies merely aggravates the problem, and even while the assemblies are being individually cleaned, but more particularly while they are being built into a laminating pack, they are scattering particles which may come to rest on the metal surfaces therein.

It is, therefore, an object of the present invention to provide a satisfactory means for simultaneously removing foreign particles from two closely adjacent plane surfaces.

It is also an object of this invention to provide a satisfactory means for simultaneously removing foreign particles from a pair of closely adjacent plane surfaces in a metal-clad laminating assembly, thus facilitating the production of metal-clad laminates whose metal surfaces are free from pits and dents.

To the accomplishment of these and other objects, the present invention relates to novel devices, and to the method of using said devices, which permit a pair of closely adjacent surfaces in a metal-clad laminating pack to be simultaneously wiped free of all foreign particles without allowing either surface to be significantly exposed to the open air.

The arrangements and combinations of parts comprising the devices to which the present invention relates, as well as the method of using such devices, will be hereinafter described and more particularly pointed out in the appended claims.

In the drawings, wherein like reference symbols indicate the same parts of the device:

Figures 1, 2:
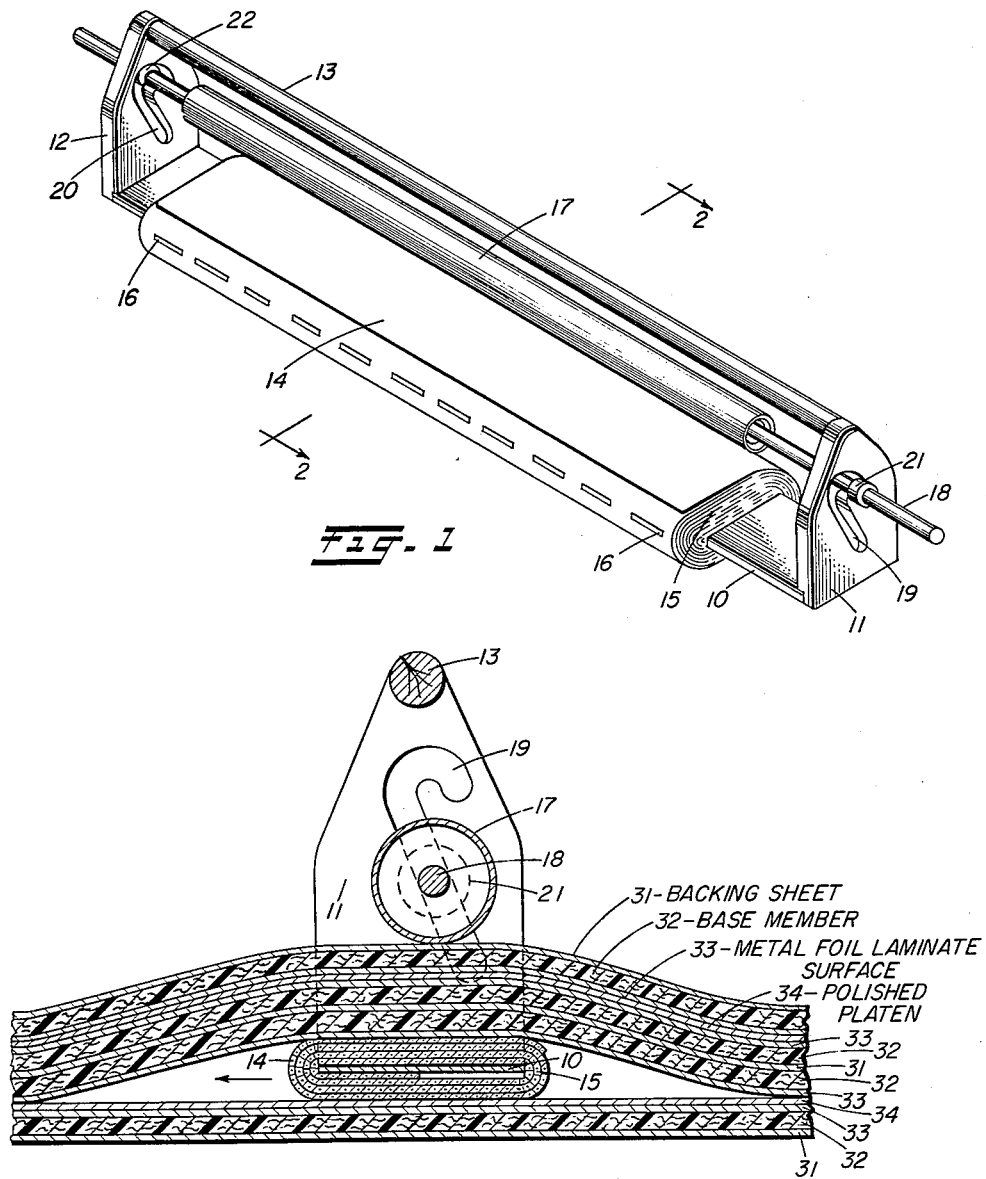
FIGURE 1 is a pictorial representation of a preferred embodiment of a device to which the present invention relates.
FIGURE 2 is an enlarged transverse vertical section, taken along the plane 2—2 of FIGURE 1, showing the use of a preferred embodiment of a device to which the present invention relates in cleaning two closely adjacent surfaces in a metal-clad multiple laminating assembly.

FIGURES 3 and 4 are enlarged partial pictorial representations of embodiments of devices to which the present invention relates, showing modifications of the arrangement of the respective side plates 40 and 50 and the axle 18.

Referring more particularly to the drawings, a bar 10 is firmly attached to the side plates 11 and 12. In a preferred embodiment (shown in FIGURE 1) the bar 10 is a substantially flat, rigid, elongated metal bar having a length at least as great as the width of the two closely adjacent surfaces to be cleaned. However, the bar 10 may be fabricated from wood, plastic, or any other available and suitable material, and both its shape and its position in relation to the side plates 11 and 12 may be altered in any way which will permit the sheet 14 to expose two substantially flat wiping surfaces to the closely adjacent surfaces to be cleaned. Preferably, the bar 10 is attached in substantially horizontal perpendicular relationship to the side plates 11 and 12 at or near the bases of said side plates.

A rod or handle member 13, firmly secured in substantially perpendicular relationship to the side plates 11 and 12 above the pressure roll 17, provides a means of guiding the device and also provides additional strength thereto. However, inasmuch as the side plates 11 and 12 may be used to guide the device, the rod 13 may be omitted if desired.

The sheet 14 is wound around the bar 10 to form initially a plurality of substantially flat layers 15, thus providing a pad of material which makes sliding contact with the surfaces which it cleans. The sheet 14 occupies a central portion of the bar 10 at least as wide as the surfaces to be cleaned and, in effect, provides a tacky or sticky surface to said central portion of the bar 10. The used portion of the sheet 14 is periodically unwrapped from the bar 10 and cut away to present a new and clean wiping surface of said sheet to each of the surfaces being cleaned. Furthermore, the sheet 14 can itself be adapted, at each complete revolution thereof around the bar 10 (for example, by means of perforations such as at that portion of the sheet 14 corresponding to an edge of the bar 10, as in the case of the line of perforations 16—16 shown in FIGURE 1), to permit one complete layer of said sheet to be removed when necessary.

The sheet 14 is formed from a pliable fibrous material in matted or woven form, such as porous paper; reinforced paper or felt; cloth, e.g., scrim fabric, bleached or unbleached cheese cloth, non-woven fabric, and the like, which has been coated or impregnated with an agent which imparts tackiness or stickiness thereto, thus facilitating the pickup and retention of foreign particles by said sheet. The sheet 14 may comprise any available and suitable material which has sufficient strength, when coated or impregnated with a tack-producing agent, to remain intact while being passed between the surfaces being cleaned.

The tack-producing agent employed to impregnate the sheet 14 is not an adhesive in the usual sense of the word, in that it does not serve to bond the surfaces being cleaned either to each other or to the sheet 14. Its primary function is to render the wiping surfaces of the sheet 14 tacky or sticky so that the pit- and dent-producing foreign particles on the surfaces being cleaned will adhere more readily to said wiping surfaces. A wide variety of tack-producing agents may be employed to impregnate the sheet 14, among which there are included petroleum products, such as polymeric oils and waxes; resinous materials of many types; derivatives of animal glues and fats, and the like. The impregnation of the sheet 14 with the tack-producing agent may be accomplished by any of a variety of conventional methods, such as dipping, spraying, roll-coating, and the like.

In a preferred embodiment (not shown in the drawings), the sheet 14 comprises a sheet of "Dura Weave" paper (a cotton fiber-reinforced paper having good wet-strength and no tendency to shred while in use, due to its perpendicular, crossed fibers; available from the Scott Paper Company) impregnated with a tack-producing agent derived from "SOHIPET-WG" petrolatum (available from the Standard Oil Company of Ohio). In preparing this impregnated sheet, the petroleum is admixed with a suitable solvent, such as ethyl alcohol, hexane, and the like, and heated to bring about solution. The sheet of paper is then passed through the petrolatum solution to effect deposition of the petroleum thereon. The impregnated sheet is then dried to evaporate the solvent.

A pressure roll 17 is mounted on a rotatable axle 18 positioned above the bar 10. The side plates 11 and 12 engage the terminal ends of the axle 18, permitting said axle to rotate freely. In a preferred embodiment (shown in FIGURE 1), the axle 18 passes through each of the angular guide slots 19 and 20 positioned in the side plates 11 and 12, respectively, the axle 18 being restrained against any substantial lengthwise movement through said angular guide slots by means of the washers 21 and 22 mounted on the axle 18 on the opposite sides of the side plates 11 and 12 from the pressure roll 17. This preferred assembly of the pressure roll 17, the axle 18 and the angular guide slots 19 and 20 permits the axle 18 with the pressure roll 17 to be moved downward from a rest position (illustrated in FIGURE 1) to positions closer to the bar 10, in relation to the thickness of material above the upper surface being cleaned, thus permitting the pressure roll 17 to exert pressure on the upper surface of the laminating pack (as illustrated in FIGURE 2) at whatever height said upper surface is from the surfaces being cleaned. Of course, numerous other modifications of the side plates and the axle may be made which will enable the pressure roll 17 to be raised or lowered in relation to the upper surface of the laminating pack. For example, the terminal ends of the axle may be fitted into inwardly open notches or grooves positioned in the side plates as shown in FIGURE 3, wherein the terminal end of the axle 18 fits into the inwardly open angular groove 41 in the side plate 40; The side plates may be provided with a series of paired openings into which the axle may be successively fitted, as shown in FIGURE 4, wherein the axle 18 engages the side plate 50 in one hole 52 of the series of holes 51, 52 and 53 (which would be paired with a similar series of holes in the side plate at the opposite end of the device), etc. Furthermore, the position of the axle may be fixed, if desired, and the bar 10 may be moveable in relation to the amount of material in the laminating pack above said bar.

The pressure roll 17 is preferably a substantially uniform cylinder having a length equal to or slightly greater than the width of the laminating assembly, with the axle 18 passing through its center, and is of sufficient weight so as to enable it to exert a force on the upper surface of the laminating pack which will result in efficient contact between the surfaces being cleaned and the wiping surfaces of the sheet 14. Of course, where the amount of material contained in the portion of the laminating pack above the upper surface being cleaned is itself heavy enough to exert a force which will result in efficient contact between the surfaces being cleaned and the wiping surfaces of the sheet 14, the axle 18 with the pressure roll 17 may be left in the rest position, out of contact with the upper surface of the laminating pack.

The use of a preferred embodiment of a device to which the present invention relates in cleaning two closely adjacent surfaces in a metal-clad multiple laminating assembly is illustrated in FIGURE 2, wherein said assembly is shown as a plurality of individual back-to-back laminating assemblies of a backing sheet 31, a base member 32, a metal foil laminate surface 33, and a polished platen 34. In use, the device is positioned so that the bar 10, having the tacky-surfaced sheet 14 wound around a central portion thereof at least as wide as the closely adjacent surfaces to be cleaned, is inserted between two such surfaces, i.e., between a polished platen 34 and a metal foil surface 33 of an individual laminating assembly. If a force greater than that exerted by the amount of material contained in the portion of the laminating pack above the metal foil surface 33 is required to provide efficient contact between the surfaces being cleaned and the wiping surfaces of the sheet 14, the pressure roll 17 is lowered, as shown, to come in contact with the upper surface of the laminating pack. The device is then guided between the surfaces, e.g., by means of the rod 13 and the side plates 11 and 12, with the pad of material formed by the sheet 14 making sliding contact with each surface. This causes the sheet 14 to pick up and retain pit- and dent-producing foreign particles simultaneously from each surface without allowing either surface to be significantly exposed to the air, inasmuch as said surfaces come together again once the bar 10 has passed between them.

It will be obvious to those skilled in the art that other changes and variations may be made in carrying out the present invention without departing from the spirit and scope thereof as defined in the appended claims.

I claim:

1. A device for simultaneously cleaning two closely adjacent plane surfaces which comprises: a pair of side plates; a non-rotatable bar attached to said side plates in substantially horizontal perpendicular relationship thereto; a sheet of fibrous material, impregnated with a tack-producing agent, wrapped around a central portion of said bar; a rotatable axle, positioned above said bar, engaging said side plates; a substantially uniform cylindrical pressure roll mounted on said axle, and means whereby said axle can be moved downward, from a rest position, towards said bar and upward, away from said bar, towards said rest position.

2. A device for simultaneously cleaning a pair of closely adjacent plane surfaces in a metal-clad laminating assembly, wherein one of said surfaces is that of a thin sheet or foil of a relatively soft metal, which comprises: a pair of side plates, each having an angular guide slot disposed therein; a non-rotatable, substantially flat, rigid elongated bar attached to said side plates in substantially horizontal perpendicular relationship thereto; a sheet of fibrous material at least as wide as the surfaces to be cleaned, impregnated with a tack-producing agent, wrapped around a central portion of said bar in a plurality of substantially flat layers, said sheet being adapted to permit successive layers thereof to be exposed to the surfaces to be cleaned; a rotatable axle, positioned above said bar; a substantially uniform cylindrical pressure roll mounted on said axle, said axle engaging the angular guide slots disposed in said side plates; a pair of washers mounted on said axle, said washers being respectively positioned on the sides of said side plates opposite said pressure roll to restrain said axle from any substantial lengthwise movement through said angular guide slots, said axle being movable within said angular guide slots so as to permit said pressure roll to be moved downward, from a rest position, towards said bar and upward, away from said bar, towards said rest position, and a handle member, positioned above said pressure roll, attached to said side plates in substantially perpendicular relationship thereto.

3. A device for simultaneously cleaning two closely adjacent plane surfaces which comprises: a pair of side plates, each having an angular guide slot disposed therein; a non-rotatable bar attached to said side plates in substantially horizontal perpendicular relationship thereto; a sheet of fibrous material, at least as wide as the surfaces to be cleaned, impregnated with a tack-producing agent, wrapped around a central portion of said bar in a plurality of substantially flat layers, said sheet being adapted to permit successive layers thereof to be exposed to the surfaces to be cleaned; a rotatable axle, positioned above said bar, engaging the angular guide slots disposed in said side plates, and a substantially uniform cylindrical pressure roll mounted on said axle, said axle being movable within said angular guide slots so as to permit said pressure roll to be moved downward, from a rest position, towards said bar and upward, away from said bar, towards said rest position.

4. A device for simultaneously cleaning two closely adjacent plane surfaces which comprises: a pair of side plates, each having an inwardly open angular groove disposed therein; a non-rotatable bar attached to said side plates in substantially horizontal perpendicular relationship thereto; a sheet of fibrous material, at least as wide as the surfaces to be cleaned, impregnated with a tack-producing agent, wrapped around a central portion of said bar in a plurality of substantially flat layers, said sheet being adapted to permit successive layers thereof to be exposed to the surfaces to be cleaned; a rotatable axle, positioned above said bar, engaging the inwardly open angular grooves disposed in said side plates, and a substantially uniform cylindrical pressure roll mounted on said axle, said axle being movable within said inwardly open angular grooves so as to permit said pressure roll to be moved downward, from a rest position, towards said bar and upward, away from said bar, towards said rest position.

5. A device for simultaneously cleaning two closely adjacent plane surfaces which comprises: a pair of side plates having a series of paired openings disposed therein; a non-rotatable bar attached to said side plates in substantially horizontal perpendicular relationship thereto; a sheet of fibrous material, at least as wide as the surfaces to be cleaned, impregnated with a tack-producing agent, wrapped around a central portion of said bar in a plurality of substantially flat layers, said sheet being adapted to permit successive layers thereof to be exposed to the surfaces to be cleaned; a rotatable axle, positioned above said bar, engaging one pair of said series of paired openings disposed in said side plates, and a substantially uniform cylindrical pressure roll mounted on said axle, said axle being movable from one pair of said series of paired openings to another pair so as to permit said pressure roll to be moved downward, from a rest position, towards said bar and upward, away from said bar, towards said rest position.

References Cited in the file of this patent

UNITED STATES PATENTS

| | | |
|---|---|---|
| 1,468,380 | French | Sept. 18, 1923 |
| 1,509,731 | Keir | Sept. 23, 1924 |
| 1,858,879 | Carlson | May 17, 1932 |